UNITED STATES PATENT OFFICE.

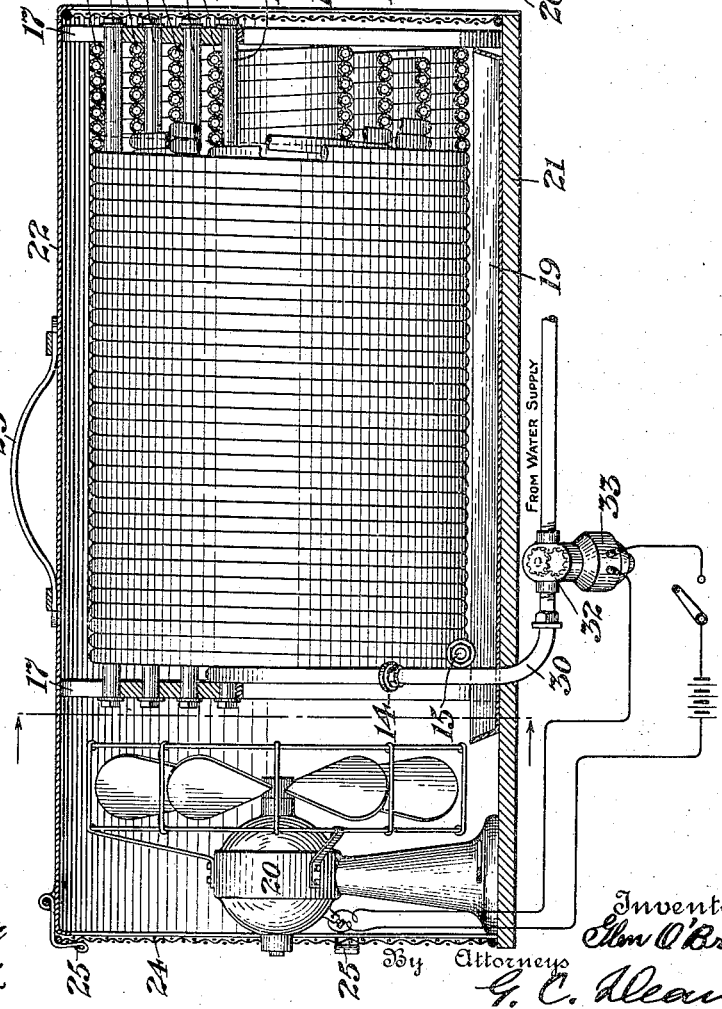

GLEN O'BRIEN, OF MANHATTAN, KANSAS, ASSIGNOR OF ONE-HALF TO ELENOR RAE CARR, OF CHICAGO, ILLINOIS.

AIR COOLER AND DEHUMIDIFIER.

1,189,470. Specification of Letters Patent. Patented July 4, 1916.

Application filed April 28, 1913. Serial No. 764,206.

*To all whom it may concern:*

Be it known that I, GLEN O'BRIEN, a citizen of the United States, and resident of Manhattan, in the county of Riley and State of Kansas, have invented certain new and useful Improvements in Air Coolers and Dehumidifiers, of which the following is a specification.

This invention relates to certain improvements in methods of and devices for effecting changes in temperature of the air and more particularly the air of living rooms, offices, hospital wards, laboratories, factories, or the like.

The main object of my invention is to provide a simple, easily portable device, inexpensive to manufacture and which does not require the services of a skilled operator to set up and use the same.

My improved device in its preferred form presents such area of refrigerated or heat-absorbing surface, that a cooling medium may be advantageously employed even though its temperature is not very much below the temperature to which it is desired to cool the air. I design the apparatus so as to cool large volumes of air down to the desired temperature instead of cooling smaller volumes of air to a much lower temperature and permitting them to mix with and cool the air of the room.

In its simplest and preferable form the apparatus is adapted to utilize a cooling medium considerably above the freezing point, as for instance ordinary hydrant water of a municipal water works system, or water from an artesian well or water pumped from an ordinary well. By providing a large heat absorbing surface and causing the cooling medium to flow through a passage of great length but of compact form, I am able to utilize substantially all of the available heat absorbing properties of the liquid and deliver the same from the apparatus at a temperature above that at which it entered and nearly up to the desired room temperature. This room temperature is furthermore automatically maintained comfortable and substantially constant or uniform as it can not be cooled below or even down to the temperature of the cooling medium.

On a warm summer day it often happens that the humidity of the air is far more distressing than the actual high temperature. My improved device by lowering the temperature of the air even a few degrees will serve to precipitate out or cause the condensation of a large quantity of the moisture and thus render the air less distressing. The moisture accumulating on the cooling surface and dripping therefrom into the pan will also serve to collect dust and germs floating in the air so that the cooling is not only accompanied by a dehumidizing action but also by an air purifying action.

My invention may assume various different forms to adapt it for different purposes or to permit it to be effectively used in different situations. The device is preferably constructed in a simple portable form and provided with detachable pipe connections, although if desired it may be permanently installed as a part of the ventilating and cooling system of the building.

Reference is to be had to the accompanying drawings, in which similar characters of reference indicate corresponding parts throughout the several views, and in which—

Figure 1 is a side elevation, portions being broken away, and Fig. 2 is a transverse section on the line 2—2 of Fig. 1.

In the specific form illustrated I employ a cooling coil preferably of thin metal tubing. This is preferably only a single length of pipe arranged in the form of a plurality of spaced concentric coils 10, 11, 12 and 13, although separate lengths may be connected in series or the separate coils in parallel. As illustrated the pipe begins at the inlet coupling 14 and is formed into first the inner coil 10, then the next outer coil and so on to the outlet 15. The connections between the coils are at opposite ends as will be apparent. The coils are preferably arranged with their axes horizontal and are spaced apart so as to form a plurality of annular air passages concentric with a central air passage, the coils being supported in any suitable manner. As illustrated I have shown two standards or brackets 17, 17, at opposite ends and connected together by coil supporting rods 18. The standards or brackets are preferably of such form as to obstruct, to the least possible degree, the entrance and exit from the annular air passages. The two standards may be mounted on a suitable base 21 which may be portable and which may carry a tray or pan 19, to catch the water of condensation which may collect on the coils and drip therefrom.

The device is designed to be placed in the room which it is desired to cool and the air of the room is forced through the air passages to effect an interchange of temperature between the air and the medium within the pipe. The air forcing means is preferably an ordinary electric fan 20, the base or standard of which may rest upon the base 21 and the extreme diameter of the blades of which may be approximately equal to the diameter of the external coil 13. To render the device more sightly and to better guide the air over the cooling surfaces I provide a casing 22 of any suitable form, but preferably of sheet metal and preferably removable from the base 21 to permit the washing of accumulated dust and dirt from the coils. This casing preferably extends beyond the coils at one end so as to inclose the fan and may have a door 24 which may be closed beyond the fan to partially conceal the fan, muffle the sound thereof and prevent any one from coming in contact with the fan or articles being drawn into the pipe by the fan. This door is preferably of reticulated metal and may be either a perforated plate or wire screen, and may be secured in place by clips 25 or in any other suitable manner. The casing itself may have a handle 23 by which the entire device may be carried, the casing being detachably secured to the base by clips or hooks 26.

As previously stated my improved device is adapted to utilize ordinary city water as a cooling medium and as the device is portable, flexible hose 30 may be connected to the apparatus one leading from an ordinary spigot to the inlet of the coil and the other leading from the outlet of the coil to the sewer or other point of disposal of the waste water. Of course the water may be conducted to a storage tank and used for other purposes or may be used in any manner desired after leaving the apparatus. The same piping arrangement would of course be employed for artesian well water when the latter is to be used, as a cooling medium instead of city water. If desired I may employ the water from an ordinary well which water is normally at a temperature somewhat below that at which it is desired to maintain the temperature of the room. When such water is used it is necessary to provide some sort of water circulating means which may if desired include a simple gear pump 32 operated from a small electric motor 33. It is only necessary to maintain a comparatively slow circulation and therefore it is not necessary that a large or high speed pump be provided. Due to the great difference in the specific heat of air and water a small quantity of water will serve for the cooling of a very large volume of air. If the pump be operated by an electric motor I may if desired wire the motor of the pump and the motor of the fan in the same circuit so that by throwing one switch or pressing one button both the air circulating and the water circulating devices will start to operate.

In the accompanying drawings I have shown an electric fan for effecting the desired circulation of the air over the coils. It is of course evident that this fan may either blow the air through the casing from the fan over the coils or that it may suck air through the casing past the coils to the fan.

My improved device does not necessitate the use of any special form of fan, but it is so designed that the ordinary small electric fan commonly used for air circulation in rooms may be placed on the base within the casing of the device, or may be removed and used independently of the cooler at other times. For use in localities where an electric current is not available, but where a source of cooling water under pressure is available, I may drive the fan by water motor instead of an electric motor and may connect the water motor in circuit with the cooling coil, so that the turning on of the water to the coil from the source of water supply will start the fan in operation.

Although my improved device is especially designed for cooling purposes it is evident that the pipes may be connected to the water heating system of a furnace or kitchen range and the device used for warming a room at a distance from the source of heated medium and by the circulation of hot water through the coils of the apparatus. It is also evident that other cooling mediums than water may be employed if available. I may circulate brine, ammonia or any other cooling fluid or steam, or any heating fluid through the coils to effect the desired change of the temperature of the air.

Having thus described my invention, what I claim as new and desire to protect by Letters-Patent, is:

1. An air cooling device comprising a base, spaced standards thereon, a plurality of horizontally disposed concentric spaced helical pipe coils supported by said standards the turns of pipe in each coil being comparatively close together to form longitudinal passages between successive coils and means for forcing air through said passages.

2. A portable device for modifying the temperature of rooms comprising a plurality of spaced concentric helical coils extending substantially horizontal, a fan for effecting the circulation of air between said coils, spaced brackets at opposite ends of said coils and substantially following the outlining of said coils and rods connecting said brackets for supporting said coils.

3. A portable device for modifying the temperature of rooms, comprising a plurality of spaced, concentric, helical pipe coils extending substantially horizontal, a fan for effecting the circulation of air between said coils, rods extending lengthwise of said
5 coils for supporting the latter, and supporting means for the ends of said rods.

Signed at New York in the county of New York and State of New York this 23rd day of April A. D. 1913.

GLEN O'BRIEN.

Witnesses:
C. W. FAIRBANK,
FLORENCE LEVIEN.